United States Patent [19]

Pobanz

[11] 3,950,910

[45] Apr. 20, 1976

[54] SHELTER PANEL

[75] Inventor: Walter Kent Pobanz, Ballwin, Mo.

[73] Assignee: American Air Filter Company, Inc., Louisville, Ky.

[22] Filed: Sept. 24, 1974

[21] Appl. No.: 508,818

[52] U.S. Cl. .................................. 52/618; 52/621; 52/625; 151/37
[51] Int. Cl.² ...................... F16B 5/02; E04C 2/32
[58] Field of Search ............ 52/618, 621, 410, 625, 52/624; 151/37

[56] References Cited
UNITED STATES PATENTS

| | | |
|---|---|---|
| 887,962 | 5/1908 | Reisner .................................. 151/37 |
| 2,128,757 | 8/1938 | Olson .................................... 151/37 |
| 2,298,552 | 10/1942 | Du Vall .................................. 151/37 |
| 3,823,526 | 7/1974 | Rose ..................................... 151/37 |

FOREIGN PATENTS OR APPLICATIONS

| | | | |
|---|---|---|---|
| 10,972 | 6/1928 | Australia .............................. 52/618 |
| 450,524 | 10/1934 | United Kingdom .................. 52/618 |
| 885,722 | 12/1961 | United Kingdom .................. 52/410 |
| 918,265 | 10/1946 | France ................................. 52/618 |
| 726,933 | 10/1942 | Germany ............................. 52/618 |

Primary Examiner—Frank L. Abbott
Assistant Examiner—James L. Ridgill, Jr.

[57] ABSTRACT

A wall panel having a flat face member and a flat back member with a plurality of corrugated sheets disposed in a plurality of superimposed layers with corrugations of adjacent sheets extending in crossed relation and with such adjacent layers of corrugated sheets sandwiched between the face and back members.

4 Claims, 4 Drawing Figures

SHELTER PANEL

BACKGROUND OF THE INVENTION

The invention relates to an improved wall panel construction and, more particularly, to a new, useful and nonobvious wall panel utilizing a plurality of corrugated sheets disposed in a plurality of superimposed layers in crossed relation with adjacent layers of corrugated sheets.

Various types of arrangements have been used in the past for the construction of wall panels. In military shelters, for example, honeycomb panels and aluminum skin panels having foam cores have been utilized. These prior art wall panels have been complex in construction and erection, requiring elaborate installation arrangements and have been found to be relatively heavy and expensive.

SUMMARY OF THE INVENTION

The present invention provides a straightforward and economical wall panel arrangement which is lightweight, strong, and relatively economical in relation to the prior art structures. The present invention further provides a straightforward wall panel which can be easily installed and removed.

Various other features of the present invention will become obvious to one skilled in the art upon reading the disclosure set forth hereinafter.

More particularly, the present invention provides a wall panel comprising a generally flat face member and a generally flat back member with a plurality of elongated corrugated sheets disposed in a plurality of superimposed layers with the corrugations of adjacent layers extending in cross relation to each other and with the corrugated sheets sandwiched between the face member and the back member.

It is to be understood that various changes can be made by one skilled in the art in the arrangement, form and construction of the several parts of the apparatus disclosed herein without departing from the scope and spirit of the present invention.

Referring to the drawing.

Figure 1:
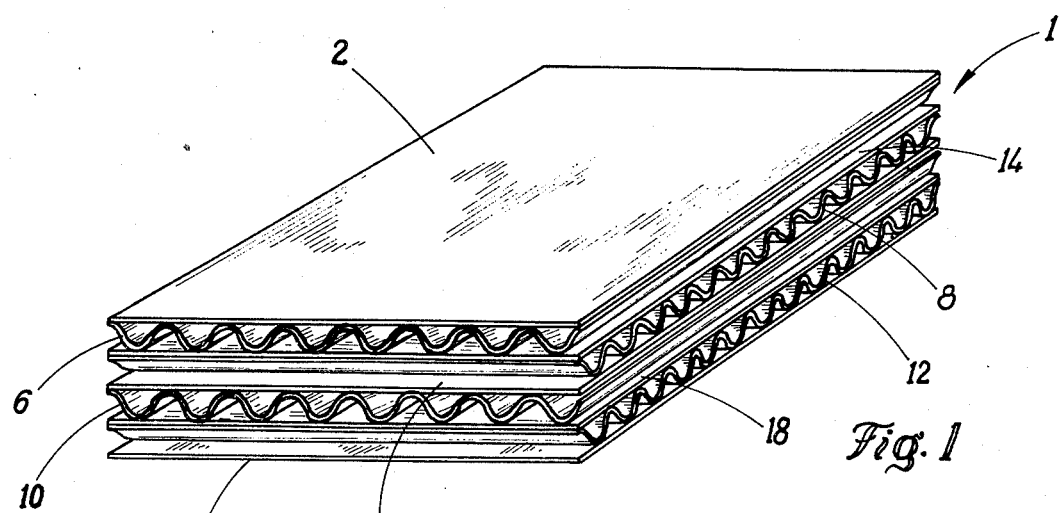
FIG. 1 is a perspective view of a preferred wall panel of the present invention.

The wall panel 1 as illustrated in FIG. 1 consists of front face member 2; a back face member 4; a plurality of corrugated sheets or foils 6, 8, 10 and 12; and a plurality of flat sheets 12, 14, and 16 disposed between adjacent corrugated foils. Corrugated foils 6, 8, 10 and 12 are disposed in a plurality of superimposed layers in cross relation with adjacent layers of the sheets wherein the angle of crossing in the embodiment shown is about 90°. The angle of crossing is arbitrary but is generally about 90° and the number of corrugated foils, four being shown, is also arbitrary and will depend upon the type of foil used, the size of corrugations, as well as the type of use to which the wall panel will be utilized. The sheets 14, 16 and 18 which are disposed between adjacent layers of the corrugations are provided as means for attaching adjacent layers of foils in a fixed position. The attachment in the illustration is by glue lines (not shown) disposed between the outer surfaces of the ridges and grooves of the corrugated foils and the flat sheets to which they are in contact. It is realized that further means for attaching the corrugated sheet layers to adjacent corrugated sheets may be by other conventional means, such as, welding or cementing the layers directly to adjacent corrugated sheets at the contacting points of the outer surfaces of the grooves and ridges. However, it has been found that when using a thin metal corrugated foil of, for example, about 0.0020 inch thickness, there is very little room for contact between the adjacent layers of metal foil. Therefore, it is preferred to insert between adjacent layers of corrugated metal foil a very thin flat sheet of material such as, a thin piece of paper, in order to increase the binding surface area. In the preferred embodiment, the flat face member 2 and the flat base surface 4 are sheets of kraft paper which are fire-retardent and/or water-resistent. Kraft paper having thicknesses of one-sixteenth of an inch and less have been found acceptable for face and back members 2 and 4.

Figure 2:
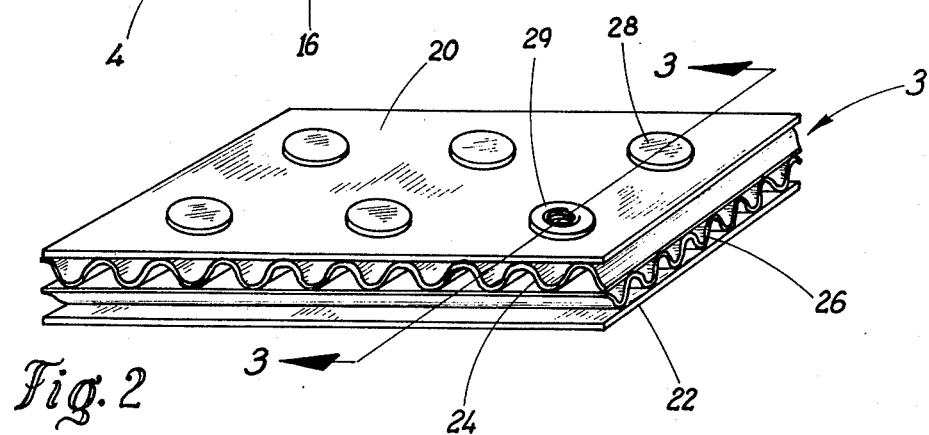
FIG. 2 is a perspective view of another preferred wall panel of the present invention.
Figure 3:
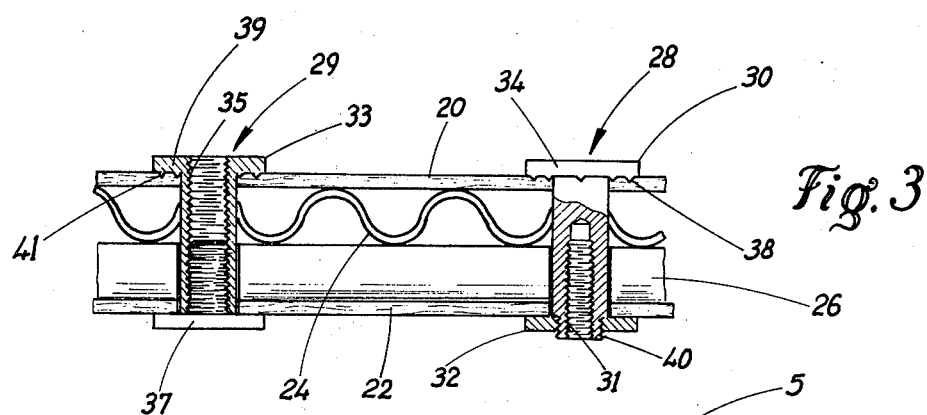
FIG. 3 is a cutaway in elevation along line 3—3 of the perspective view of FIG. 2.

FIGS. 2 and 3 illustrate a second preferred embodiment of the present invention wherein the means for attaching substantially flat face and back members together with a plurality of elongated corrugated sheets disposed therebetween in a plurality of superimposed layers in cross relation with adjacent layers of sheets utilizing a fastening means is shown. The wall panel 3 includes a front face member 20 and a back substantially flat member 22 with corrugated sheets 24 and 26 disposed therebetween. FIGS. 2 and 3 further illustrate two different fastening means for fastening the face member 20 to the back member 22 with the corrugated sheets 24 and 26 disposed therebetween. The first fastening means is a two piece fastening means 28 including a first fastening or male piece 30 adapted to receive in threaded relation either a male fastening or a female fastening piece. First fastening piece 30 includes a head 34 and a plurality of teeth 38 on the underside of the head 34 for engaging with the face surface member 20 and extends substantially through the entire thickness of the shelter panel. Furthermore, piece 30 includes external threads 40 with the face surface member 20 for mating with a nut 32 or the like in addition to the internal threads 31 for receiving a male fitting (not shown) for mounting equipment to the panel. The second fastening means 29 is also of two piece construction including a female fastening piece 33 with a threaded aperture 35 therein for receiving a male fastening piece 37. Fastening piece 33 includes a head 39 and a plurality of teeth 41 on the underside of the head 39 for engaging with the face surface member 20. Fastening piece 33 extends substantially through the entire thickness of the shelter panel and the threaded aperture 35 extends substantially through piece 33 whereby male type fittings may be utilized on either side of the shelter panel for mounting equipment and the like thereon. This means for attaching equipment and the like will apply compressive loading to the panel without shear stress. Furthermore, it has been found that the compressive strength to shear strength of this type of fabricated panel is generally about 5 to 1 in favor of compressive strength.

Fastening devices 28 and 29 are shown as being received in threaded relation, but it is realized that the fastening devices or means may be put together in, for example, a friction type relationship with the teeth engaging with the face and back surface members to prevent movement or turning of the corrugated layers once the panel is put together.

FIG. 2 only shows two corrugated sheets in cross relation but it is realized that a plurality of corrugated sheets in cross relation superimposed on adjacent layers of sheet at about ninety degree angles may also be utilized to increase the thickness and strength of the wall panel.

Figure 4:
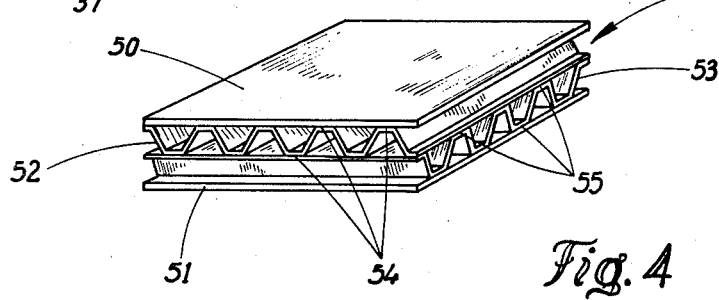
FIG. 4 is a perspective view, in section, of even another preferred wall panel of the present invention.

FIG. 4 illustrates another preferred embodiment wherein the grooves in the corrugated foils are substantially flat to increase the contact surface between the foils and the flat surface members. In the embodiment, the wall panel 5 includes a front face member 50 and a back substantially flat member 51 with corrugated sheets 52 and 53 disposed therebetween. The corrugated sheets 52 and 53 include flat contact surfaces 54 and 55 respectfully, at the apexes of the corrugations. Sheets 52 and 53 are attached by adhesive means on the outer surfaces of the flat contact surfaces 54 and 55. The flat members 50 and 51 are also joined to the sheets 52 and 53 by adhesive means applied to the outer surfaces of the flat surfaces 54 and 55.

It will be realized that various changes may be made to the specific embodiments shown and described without departing from the principles of the present invention.

What is claimed is:

1. A wall panel comprising a generally flat face member and a generally flat back member with a plurality of elongated corrugated sheets of metal foil disposed in a plurality of superimposed layers with the corrugations of adjacent layers extending in cross relation to each other and with said corrugated sheets sandwiched between said face member and said back member; and, fastening means attaching said flat face member to said flat back member with said corrugated sheets disposed therebetween, said fastening means including a male portion in nesting communication with a female portion, said male portion including internal threads therein for mounting equipment thereto, at least one of the portions having a head and a plurality of teeth on the underside thereof engaging with one of the surface members.

2. A wall panel of claim 1 including elongated flat sheets disposed between elongated corrugated sheets, said elongated flat sheets having adhesive means thereon communicating with contacting portions of said elongated corrugated sheets.

3. A wall panel of claim 1 wherein said flat face member and said flat back member are sheets of kraft paper.

4. A wall panel of claim 1 wherein said corrugated sheets have grooves therein with substantially flat contact surfaces at the apexes thereof.

* * * * *